UNITED STATES PATENT OFFICE.

CARL SORGER, OF NIEDERLAHNSTEIN-ON-THE-RHINE, GERMANY.

ACID FERRIC PHOSPHOR TARTRATE.

995,038.          Specification of Letters Patent.     Patented June 13, 1911.

No Drawing.    Application filed September 3, 1908.   Serial No. 451,587.   (Specimens.)

*To all whom it may concern:*

Be it known that I, CARL SORGER, doctor of philosophy, a subject of the King of Prussia, residing at Niederlahnstein-on-the Rhine, (formerly at Frankfort-on-the-Main,) Germany, have invented a certain new and useful Process of Manufacturing Iron Phosphor Tartrate, of which the following is a specification.

The water-insoluble iron salts of phosphoric acid are dissolved by the so-called vegetable acids, as tartaric acid (H. Quartaroli, *Chemisches Centralblatt* 1905, page 1609). It was observed that in this solution iron salts of the complex phosphor-tartaric acid are formed, similar to those of the known borotartaric acid (*Archiv der Pharmazie* 190, 1868, pages 54 and 55; also, *Jahresbericht über die Fortschritte der Chemie von F. Fittica für das Jahr* 1879 (publ. 1881), page 665). The acid iron phosphor tartrate can be precipitated from the solution by neutralizing the excess of acid with some alkali. However, it is more advisable to treat the precipitated ferric phosphate with the acid alkali salts of tartaric acid, or chlorid of iron with phosphor-tartaric alkali. The chemical formula could so far not be ascertained.

The acid ferric phosphor-tartrate is difficultly soluble in water and diluted acids, but dissolves in strong acids and can be precipitated therefrom by means of alkali. Upon neutralization with alkali, water-soluble alkali double salts are formed which by an excess of alkali are separated in the warm state as reddish-brown precipitates. They resemble ferric hydroxid in appearance, but dissolve in pure water and contain tartaric acid and phosphoric acid in chemical combination. Ammonia, like the alkalis, dissolves more slowly, but in excess does not cause precipitation. The solution remains unchanged also upon addition of ferrocyanid of potassium. The dry ferric phosphor-tartrate is of yellowish-green appearance, turns grayish-blue upon exposure to light, and is tasteless and odorless. Upon heating in the open air, the organic substance is first charred, then glows, and leaves oxid of iron and phosphate of iron ashes. Heated with concentrated sulfuric acid, the salt is decomposed and carbonic acid and carbon monoxid are generated, while the solution turns brown. These properties characterize the substance as a new chemical body. It possesses great therapeutic value which is still enhanced by the presence of phosphoric acid.

Example I: Upon treating 2 molecular proportions of ferric phosphate, obtained by precipitating a solution of 400 parts sodium phosphate ($Na_2HPO_4$) by means of chlorid of iron solution containing 270 parts chlorid of iron ($Fe_2Cl_6$), with a solution of 3 molecular proportions of acid sodium tartrate (obtained from 220 parts tartaric and 85 parts sodium carbonate), the yellow ferric phosphate in the warm state, when stirred, is liquefied and changed to the greenish-yellow mass of ferric phosphor-tartrate which, washed with water and dried in a dark place, will form a greenish-yellow powder.

Example II: Upon adding to the solution of 400 parts disodium phosphate in 1000 parts water, 220 parts tartaric acid and 85 parts sodium carbonate, while heating up and stirring, and adding to this solution of readily soluble sodium phosphor tartrate 270 parts ferric chlorid dissolved in 500 parts water, the greenish-yellow, acid ferric phosphor-tartrate is promptly precipitated, which is then filtered, washed with water, pressed and dried in a dark place.

The order of procedure in mixing the ingredients is the following: After treating a solution of disodium phosphate ($Na_2HPO_4$) with chlorid of iron ($Fe_2Cl_6$), phosphate of iron is precipitated; but if the tartaric acid or acid sodium tartrate is added, the mentioned phosphate of iron is changed to the greenish ferric phosphor tartrate as described in Example I.

Claim of patent:

Process of manufacturing acid ferric phosphor-tartrate, consisting in (1) treating ferric phosphate with acid sodium tartrate in the ratio of 2 molecules of the former to 3 of the latter, and (2) treating the solution of the alkali phosphor-tartrate with chlorid of iron.

CARL SORGER.

Witnesses:
   HEINRICH JUNG,
   GEORG BERTENBREITER.